Sept. 30, 1952 W. S. PETERSON, SR 2,612,003
METHOD AND MEANS FOR MANUFACTURING
TAPERED FISHING LEADERS
Original Filed Nov. 17, 1947 2 SHEETS—SHEET 2
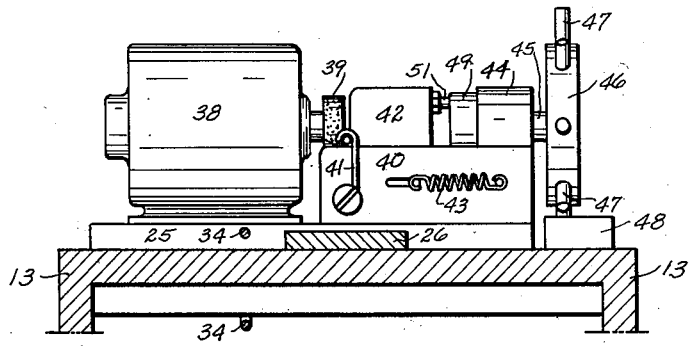
Fig. 3
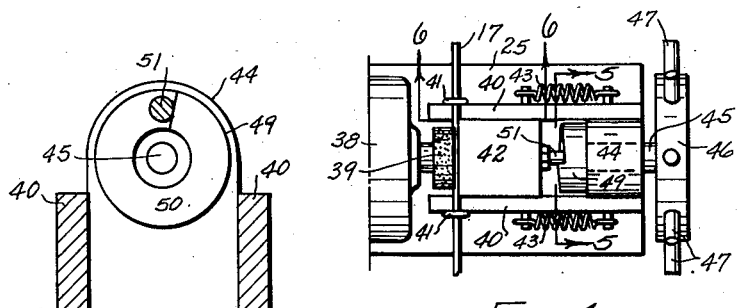
Fig. 5    Fig. 4
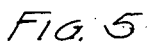
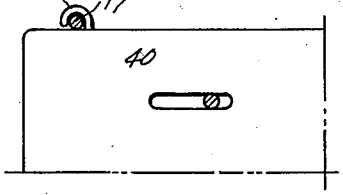
Fig. 6
Fig. 7
INVENTOR:
WALTER S. Peterson, SR.
BY
ATTORNEY Patented Sept. 30, 1952

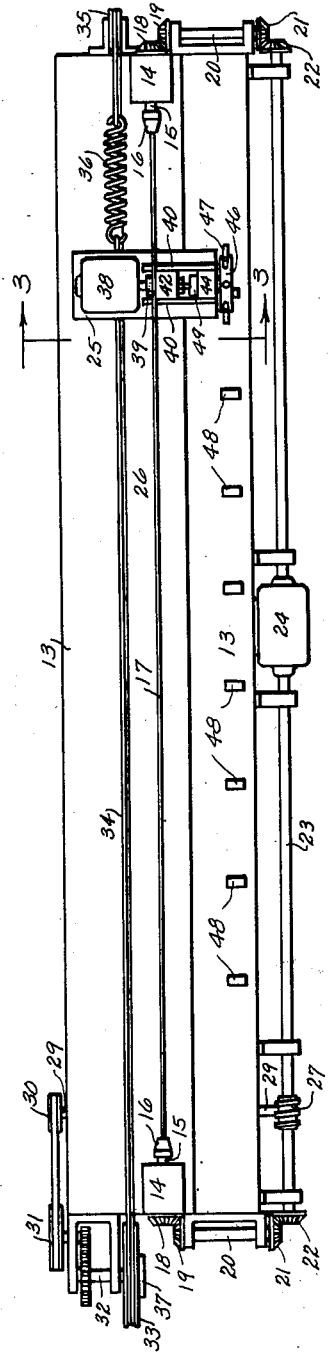

2,612,003

UNITED STATES PATENT OFFICE 2,612,003

METHOD AND MEANS FOR MANUFACTURING TAPERED FISHING LEADERS

Walter S. Peterson, Sr., Denver, Colo.

Original application November 17, 1947, Serial No. 786,527. Divided and this application March 21, 1951, Serial No. 216,777

6 Claims. (Cl. 51—56)

This invention relates to the art and practice of fishing, and more particularly to means for the production of tapered fishing line leaders of the type illustrated and described in applicant's co-pending application, Serial No. 786,527, filed November 17, 1947, of which this application is a division.

The principal object of the invention is to provide an improved construction, combination, and arrangement of elements constituting apparatus operable for the production of unitary, tapered, fishing line leaders.

A further object of the invention is to provide an improved method applicable to effect the tapering of conventional elements into the form of tapered, unitary, fishing line leaders.

A further object of the invention is to provide apparatus for the production of tapered, unitary, fishing line leaders that is largely automatic in operation, rapid and efficient in the production of tapered leaders in form and condition ready for use, that is simple and inexpensive of manufacture and productive employment, and that is adaptable to a wide variety of particular operative applications.

With the foregoing and other objects in view, my invention consists in the method productive of such leader, and in the construction, arrangement, and combination of elements constituting apparatus for manufacture of such leader, all as hereinafter set forth, pointed out in my claims, and illustrated by the accompanying drawings, in which—

Fig. 1 is a somewhat diagrammatic, top view of typical apparatus for the production of the improved tapered leader, as assembled and operatively arranged ready for action;

Fig. 2 is a side elevation of the showing of Fig. 1;

Fig. 3 is a cross-section, on an enlarged scale, taken on the line 3—3, of Fig. 1;

Fig. 4 is a top plan view of the right-hand portion of Fig. 3;

Fig. 5 is a cross-section, on a further enlarged scale, taken on the line 5—5 of Fig. 4;

Fig. 6 is a fragmentary, detail elevation, partly in section, of elements comprised within the zone indicated by the line 6—6 of Fig. 4; and Fig. 7 is an elevation, on a much enlarged scale, of a typical tapered leader embodying the improvement of the invention, the major intermediate portion of the showing being broken away to conserve space.

In the art and practice of fishing by means of hand rods, it is customary, for various reasons, to interpose a length of material differing from that of the fishing line between the free end of said line and the hook, bait, or lure manipulated therethrough. In the pursuit of certain types of game fish, such as trout, the length of the interposed material, known as a leader, between the hook and line end has as one function to minimize the visibility and conspicuousness of the line, to which end the leaders so used are commonly of nylon, gut or comparable relatively strong, translucent material, and have as another, simultaneous function to facilitate casting and manipulation of the light-weight lures or baits, customarily artificial flies, in a manner calculated to attract, and not frighten, the fish. In an attempt to satisfy the requirements for leaders employed in so-called fly-fishing, it has heretofore been the practice to knot together relatively short lengths of nylon, gut, or comparable material in a succession of progressively decreasing diameters and thereby approximate a leader of desired length and material and tapered form; it having been determined that the leader of greater diameter at the point of line end attachment and lesser diameter at the point of hook attachment was desirable and effective in attainment of the line and bait manipulation deemed proper. Leaders of knot-assembled type above described are satisfactory as to the materials employed, but the junctions of their constituent, different diameter strands have proved to be points of disruptive weakness. Due to the short bends and consequent kinking of the strand material in the knots, such knots modify to some extent the translucent, inconspicuous value of the leader material, and such knots serve as nodes to interrupt and hamper the smooth whipping and manipulation of the leader through the agency of the rod and line; all of which disadvantages have long emphasized the desirability of a continuous, integral length of nylon or gut material tapered from end to end in a length and to terminal diametric dimensions suited to its specific use as a fishing line leader, and the instant invention is directed to the provision of such a leader.

As shown in Fig. 7 of the drawings, the improved leader of the invention is a continuous strand or length 10 of nylon, gut, or analogous translucent material, solid throughout its length, circular in section at all points in its length, and exteriorly tapered with substantial uniformity from a greater diameter end 11 attachable in any convenient or desired manner to and as an extension from the free end of a fish line and to a lesser diameter end 12 connectible in any convenient or desired manner with the hook, bait or lure to be employed.

For the production of tapered leaders of the type shown and described from uniform-diameter strands or lengths of nylon, gut, and the like, a flat-top table 13 is provided in an over-all length exceeding that of the leader to be produced and is suitably and rigidly supported with its top surface horizontal. Fixed to and rising above opposite ends of the table 13, journals 14 rotatably mount spindles 15 in spaced relation and axial alignment longitudinally of and above the table top surface. Opposed inner ends of the spindles 15 are equipped with suitable chucks 16 actuatable to clamp opposite ends of a uniform-diameter strand 17 of the material from which the leader is to be constituted, and to lightly tension said strand in axial alignment with and bridging relation between the spindles 15. Outer ends of the spindles 15 are equipped with bevel gears 18, each of which meshes with a bevel driving gear 19 on the inner end of a shaft 20 journalled for rotation to and transversely of the table 13 and extending beyond the table side margin. Outer ends of the shaft 20 are equipped with bevel gears 21 which mesh with bevel driving gears 22 on the opposite ends of a shaft 23 rotatably disposed in spaced parallelism with and adjacent a long side of the table 13, and an electric motor 24 in direct driving relation with the shaft 23 is hence effective upon energization to rotate the shaft 23 and rotatively drive the spindles 15 at the same speed and in the same direction through the agency of the driving connections 18, 19, 20, 21 and 22; such rotation of the spindles 15 operating to spin the strand 17 about its axis at a speed and in a direction determined by the motor 24 and the proportions and relationships characteristic of the driving connections noted.

A grinding head assembly is supported by and arranged to slide longitudinally of the table 13 top surface. The grinding head assembly includes a base element 25 disposed transversely of the table top in guided engagement with a track 26 fixed longitudinally of and rising above the table top in spaced, parallel relation with the axis of the mounted strand 17. The base 25 and the elements carried thereby are designed to be power-fed in one direction along the track 26 and table top at a speed suitably proportioned to the speed of strand 17 rotation, to which end a worm 27 fixed to and for rotation with the shaft 23 operatively meshes with a gear 28 on the appropriate end of a shaft 29 disposed for rotation transversely and adjacent one end of the table 13 below the table top surface, and a pulley, or equivalent element, 30 on the other end of said shaft 29 is operatively connected in driving relation with a relatively larger pulley 31 rotatably mounted adjacent the table end in driving relation with a shaft 32 carrying a drum 33 selectively clutch-connectible in driven relation with the shaft 32. The drum 33 is disposed with its axis of rotation perpendicular to the travel of the base 25 and is formed with a relatively narrow peripheral channel opening at its upper margin slightly above the table 13 top surface at one side of and in an alignment paralleling the track 26, so that a flexible connector 34 secured at one end to the base 25 may be engaged in and about the channel of said drum 33 and thence returns beneath the table top surface and about an idler wheel 35 at the other end of the table to connection through a resilient coupling 36 with the opposite side of said base, thereby completing an endless, flexible loop including said base and the drum in a manner to apply rotation of said drum to effect linear travel of the base along the table and track 26. The effective drive ratio of the connections between the work 27 and drum 33 is such as to rotate the latter at a speed very much lower than that of said worm for consequent relatively slow travel of the base 25, and said power connections are such as to move said base in but one direction along the table 13, thus pointing the need of a manually-actuatable clutch 37 controlling the driven relation between the shaft 32 and drum 33 in such selectively-manipulatable manner as permits interruption of the power drive to said drum when the base 25 approaches the limit of its travel toward the drum, manual returned of said base to the other end of said table through free reverse rotation of said drum and reverse travel of the endless loop engaged about the latter, and reestablishment of the driving connection between the shaft 32 and drum 33 when the base 25 is repositioned for initiation of its powered travel.

Fixed to the base 25 at one side of the strand 17, an electric motor 38 is mounted with its power shaft axis perpendicular to and in approximately the same horizontal plane with the axis of the strand 17, and the end of the motor 38 power shaft adjacent the strand 17 fixedly mounts and rotatably drives a grinding element 39 having a suitably-abrasive, circular, end face disposed tangent to the adjacent side of the strand 17. It is the function of the element 39, rotatively driven at relatively high constant speed by the motor 38, to grind away strand 17 surface areas for progressive reduction of the strand diameter as the head assembly travels from one end and to the other end of the table with such grinding element in controlled pressure relation against the spinning strand 17, and other elements of the head assembly function to automatically control such pressure relation and determine the diameter variation resulting from grinding of the strand surface, in the manner hereinafter set forth.

Fixedly upstanding from the base 25 in spaced parallelism with and on opposite sides of the motor 38 power shaft, a pair of webs 40 rise beneath and into close adjacency with the strand 17 position and extend from adjacent the motor 38 to the end of the base remote from said motor for the constitution of an upwardly-opening, guide channel. Inner ends of the webs 40 are equipped with hooks 41 susceptible of manual angular adjustment into and out of engagement over the strand 17 on opposite sides of the grinding element 39, said hooks 41 cooperating with upper margins of the webs 40 to define a guideway wherein said strand is loosely received and moderately restrained during travel of the head assembly therealong. Reciprocable toward and away from the grinding element 39 in guided relation between the webs 40, an anvil 42 is mounted with its wear face in opposition to the abrasive face of the grinding element, and resiliently-yieldable means, such as pins fixedly projecting from opposite sides of the anvil 42 through elongated slots in the webs 40 and linked by means of retractile springs 43 to fixed points on said webs remote from the motor 38, are provided to normally urge said anvil to and resiliently retain said member at the limit of its adjustment away from the grinding element 39. As will be apparent, the spacing between the grinding element 39 and anvil determines the diameter of the strand 17 at any given point in the head assembly travel, since the grinding action of the element 39 on the strand surface will be effective only to the extent necessary to permit accommodation of said strand between said element and the opposed anvil, and such diameter-determining spacing is automatically adjusted and regulated as an incident of head travel from one end and to the other end of the table 13; the arrangement shown and hereinafter described as being designed to progressively decrease the spacing between the grinding element 39 and anvil 42 as the head assembly is powered-translated from the initial larger end to the ultimate smaller end of the tapered leader into which the strand 17 is processed. As represented, a simple arrangement for automatic adjustment and regulation of the spacing above discussed includes a journal bearing 44 rigidly between and upstanding above the ends of the webs 40 remote from the motor 38 and a shaft 45 rotatably traversing the bearing 44 in substantial alignment with the motor power shaft. The outer end of the shaft 45 fixedly engages with a pin-wheel 46 whereof the radial pin elements 47 are adapted to move in clearing relation with the table 13 top surface and successively engage against and react to actuating blocks 48 fixed to and rising in uniformly-spaced relation above the table top surface for interruption of the clear path of pin 47 travel along said table. Thus, as the head assembly moves to bring a first pin 47 into engagement against a first one of the blocks 48 an angular displacement of the wheel 46 and shaft 45 occurs as a consequence of continued head assembly travel and in an amount determined by the pin 47 elevation required to clear the block 48, whereafter the head assembly travel may continue without shaft 45 and wheel 46 angular displacement until the next succeeding pin 47 engages the next block 48 for cyclic repetition of shaft and wheel rotational adjustment corresponding with that previously had, the number and spacing of the pins 47 and actuating blocks 48 being preferably such as to effectuate one complete revolution of the shaft 45 as a consequence of head assembly travel through the complete operative range. The inner end of the shaft 45 adjacently opposed to the anvil fixedly mounts a short, cylindrical element 49 rotatable between the webs 40 and worked on its circular face opposed to the anvil 42 to present an annular, marginal cam track 50 uniformly and spirally receding from a high point determinative of its minimum spacing from the anvil 42 to a low point adjacent said high point determinative of a maximum spacing from the anvil 42 equal to said minimum spacing plus the reduction in diameter desired between the greater and lesser ends of the tapered leader to be produced. It is the function of the element 49 and its cam track 50 to move the anvil 42 toward the grinding face of the element 39 and thus correspondingly vary the spacing therebetween as the head assembly travels along the table with grinding effect on the strand 17, for which purpose a stud 51 is threadedly engaged in and with the face of the anvil adjacent the element; said stud 51 having hence an adjustable projection from the anvil susceptible of correlation with either the high point or the low point of the cam track to determine minimum or maximum spacing between the grinding element face and adjacent anvil surface; a lock nut or equivalent arrangement being provided to retain the stud 51 in any determined position of its adjustment.

With the arrangement shown and described, the head assembly is moved to the initial position of its range of travel remote from the drum 33, the pin-wheel 46 is rotated to bring the low point of the cam track 50 into registration with the free end of the stud 51, and the latter is then adjusted as to projection for determination of the desired maximum spacing between the anvil 42 and the grinding face of the element 39; the resilient-yieldable coupling of the anvil 42 to the webs 40, such as the springs 43, serving to hold said anvil away from the grinding element and the free end of the stud 51 engaged against the cam track 50. As so regulated and arranged, rotation of the pin-wheel 46 incident to power translation of the head assembly along the table top surface operates through the element 49 and stud 51 to progressively move the anvil 42 toward the element 39 with consequently augmented grinding effect on and diameter reduction of the strand 17 therebetween, until the position of minimum such spacing results from stud 51 engagement with the cam track high point at the end limit of head assembly travel. As is obvious, the range of travel of the anvil 42 relative to the grinding surface of the element 39 is limited by the pitch or offset of the cam track 50 characteristic of the element 49 included in the operative assembly, but it is wholly feasible and mechanically simple to interchange elements 49 having cam tracks 50 of varying pitch and offset characteristics, and thereby effect such range of relative anvil travel as may be desired.

Since many changes, variations, and modifications in the specific form, construction, and arrangement of the apparatus elements shown and described may be had without departing from the spirit of my invention, I wish to be understood as being limited solely by the scope of the appended claims, rather than by any details of the illustrative showing and foregoing description.

I claim as my invention:

1. Apparatus for the production of tapered fishing leaders comprising: axially aligned spindles adapted to support a strand of leader material under tension therebetween; means rotating said spindles in a common direction and at a common speed; a grinding head movable longitudinally of said strand; a grinding element mounted on said head alongside said strand; an anvil block shiftable on said head in parallelism with the axis of said spindles toward and away from the grinding element to cooperate with the latter in the definition of a variable-width, strand-receiving throat, said anvil being resiliently held away from said grinding element and in position-limiting relation therewith; and means acting to shift said anvil toward said grinding element.

2. Apparatus as set forth in claim 1, wherein the anvil is resiliently held to the limit of its spacing away from the grinding element, and the means for shifting said anvil toward the grinding element comprise a shaft perpendicular to the strand axis rotatably carried by the head on the side of the anvil remote from the strand, means for rotating said shaft as an incident of head travel, a spirally-offset, annular cam track fixed to the end of said shaft in opposition to said anvil, and a stud adjustably fixed in said anvil in end-engagement against said cam track.

3. A method for producing tapered fishing leaders comprising: tensioning a strand of flexible leader material by drawing its extremities oppositely outward; rotating both of said extremities in the same direction and at a common speed; rotating a grinding element in a plane parallel to and alongside of said strand; simultaneously moving said grinding element longitudinally of said tensioned strand; and progressively forcing the axis of said strand further from its normal position and toward said grinding element as said grinding element travels along said strand.

4. Means for manufacturing tapered fishing leaders comprising in combination: an elongated supporting member; two spaced-apart spindles mounted on said supporting member in axial alignment; means for attaching and tensioning a strand of leader material between said spindles; driving means connected to both spindles and rotating the latter in unison; a grinding head mounted on said supporting member; means for moving said grinding head along said supporting member parallel to said strand simultaneously with the rotation of the latter; a power driven grinding element mounted on said head and positioned to engage one side of said strand; an anvil mounted on said head and positioned to engage the opposite side of said strand, said anvil being movable toward and away from said strand; a rotatable cam device engaging said anvil whereby rotation of said cam device will impart movement to said anvil; and means mounted on said cam device and engaging said stationary supporting member so that travel of said head will impart rotation to said cam device.

5. Means for manufacturing tapered fishing leaders as described in claim 4 having a cam shaft projecting from said cam device; a wheel mounted on said cam shaft; and fixed contact means carried by said supporting member and engageable by said wheel for imparting rotation to said cam device.

6. Means for manufacturing tapered fishing leaders as described in claim 5 having pins projecting from said wheel and projections projecting from said supporting means at spaced intervals in the path of said pins to be engaged by the latter for imparting rotation to said cam device in consequence of the travel of said head.

WALTER S. PETERSON, SR.

REFERENCES CITED

The following references are of record in the file of this patent:

UNITED STATES PATENTS

| Number | Name | Date |
|---|---|---|
| 642,452 | Hull | Jan. 30, 1900 |
| 1,385,367 | Einsele | July 26, 1921 |
| 1,387,045 | Friedman | Aug. 9, 1921 |
| 1,509,263 | Saladino | Sept. 23, 1924 |
| 1,864,584 | Cowdery | June 28, 1932 |
| 2,463,783 | Lind | Mar. 8, 1949 |

FOREIGN PATENTS

| Number | Country | Date |
|---|---|---|
| 301,197 | Germany | Oct. 13, 1917 |